3,641,176
OLEFIN OLIGOMERISATION PROCESS
Derek Keith Jenkins, Southampton, and Christopher George Piers Dixon, Leeds, England, assignors to The International Synthetic Rubber Company Limited, Southampton, England
No Drawing. Filed Sept. 19, 1968, Ser. No. 761,000
Claims priority, application Great Britain, Sept. 20, 1967, 42,862/67; Mar. 7, 1968, 11,270/68
Int. Cl. C07c 3/10, 15/02
U.S. Cl. 260—668 B                                   6 Claims

ABSTRACT OF THE DISCLOSURE

A catalyst system and process for the polymerisation of ethylene and cyclic hydrocarbons having at least one vinyl group to form oligomers and co-oligomers (polymers of two or three monomer units), the catalyst comprises a zerovalent nickel complex of formula $$Ni(PA_xB_{3-x})_4$$

where A is hydrogen, substituted or unsubstituted alkyl, cycloalkyl, aryl, aralkyl alkoxy or aryloxy. B is halogen and $x$ is 0–3 inclusive, provided that $x$ is less than 3 in at least one branch of the complex.

---

This application relates to catalysts suitable for preparing oligomers and co-oligomers, especially dimers, of ethylene and cyclic hydrocarbons having at least one vinyl group under mild conditions of temperature and pressure, and to processes employing such catalysts.

Known processes for preparing oligomers and co-oligomers of mono and di-olefins generally require the use of pressures of between 10 and 100 atmospheres and temperatures of 70° C. or more. For example ethylene and propylene may be dimerised in the presence of π-allyl nickel halides at about 70° C. and 50 atmospheres pressure. (G. Wilke et al. Angew Chem. (International Edition) 5, 151 (1966).) The activity of this catalyst is generally low, and it is usual for it to be increased by the addition of aluminium halide or halogenated solvents, e.g. $CH_2Cl_2$.

We have found a novel catalyst system suitable for preparing in good yields oligomers and co-oligomers, especially dimers, and cyclic hydrocarbons having vinyl group of such monomers under mild conditions of temperature and pressure, e.g. at pressures of up to 5 atmospheres and temperatures of up to 100° C.

According to the present invention a catalyst system for the preparation of oligomers and co-oligomers of ethylene and cyclic hydrocarbons having at least one vinyl group comprises:

(a) A zero-valent nickel complex with phosphorus ligands containing at least one halogen atom directly attached to a phosphorus atom of general formula $$Ni(PA_xB_{3-x})_4$$

wherein A is alkyl, cyclo-alkyl, aryl, aralkyl, alkoxy, aryloxy hydrogen; B is halogen; and $x$ is 0, 1, 2 or 3, provided that in at least one such ligand of the complex $x$ is not 3;

(b) An aluminium trihalide or dihalohydride, (c) An organo-metallic compound of a Group I to III metal.

The ligands of the nickel complex need not be all the same and where appropriate one or more of the groups A of the ligands may be substituted, suitable substituents being for example, alkyl groups or halogen. Furthermore they may contain ether or thioether linkages, or imino or secondary or tertiary nitrogen atoms.

All three components of the catalyst are essential and the use of any two alone does not provide an effective oligomerisation catalyst.

A preferred class of component (a) is that obtained when $x$ is zero in the above formula. Thus nickel tetrakis phosphorus trihalides are especially preferred. These have the advantage that they are reasonably easy to prepare. The most preferred substance for use as component (a) is nickel tetrakis phosphorus trichloride which is obtainable as yellow crystals, stable in dry air and soluble in hydrocarbon solvents.

Components (b) is preferably aluminium tribromide or trichloride. It is desirable, although not essential, that the (b) component be soluble in hydrocarbon solvents. Thus aluminium trichloride may be used in the form of a complex with, for example ethers, thio-ethers or cyanides. Typical complexes of this nature are described in Dutch Specification No. 6810251.

In component (c) the metal is preferably lithium while the organic moiety is preferably alkyl, aryl, or aralkyl, more preferably alkyl, e.g. n-butyl.

Also according to the present invention there is provided a process in which ethylene and cyclic hydrocarbons having at least one vinyl group attached thereto are oligomerised or co-oligomerised in the presence of the catalyst system hereinbefore defined.

The components of the catalyst should be dissolved or dispersed under substantially anhydrous and oxygen-free conditions in dry, air-free, organic, preferably hydrocarbon, solvents. Suitable solvents are, for instance, saturated aliphatic straight chain or cyclic hydrocarbons such as hexane or cyclohexane, and aromatic hydrocarbons, such as benzene or toluene. Chlorinated solvents may be used but are not required for high efficiency and this is particularly advantageous since these are expensive and toxic and they can be hazardous to handle, especially in combinations with certain metal alkyls.

The catalyst components should desirably be used in amounts giving a molar ratio of (a) to (b) of at least 1:7.5 preferably of from 1:15 to 1:25 and a molar ratio of (a) to (c) of at least 1:15, preferably of from 1:25 to 1:35. Optimum results are generally obtained using molar ratios a:b:c of 1:20:30. The absolute concentration in the solvent should be as low as possible to be most economic and we have found that quantities as low as 0.5 millimole and even 0.25 millimole of component (a) per litre of solvent are quite adequate.

Preferably the catalyst components are added in the order (a), (b) and finally (c). Different orders of addition may give a catalyst of poor activity although interchanging the order of addition of (a) and (b) generally has little effect. Desirably the catalyst components are added to the solvent after solution therein of the monomer(s), generally to saturation. Further monomer(s) may then be added as required, these being simply passed through the catalyst solution or dispersion at a pressure of from atmospheric up to e.g. 5 atmospheres. Higher pressures can be used, but no particular advantages are provided. However good results are obtained at atmospheric pressure and this has the advantage that no special equipment is required.

Reaction temperatures of e.g. up to 100° C. may be used, a convenient procedure being to warm the catalyst solution or dispersion from approximately 0° C. until a satisfactory reaction rate is achieved. Below 10° C. very little activity is apparent, rapid reaction generally beginning at about 15°–25° C. In most cases there should be no need to exceed a temperature of about 40–50° C.

Using this catalyst system we have found that butenes may be produced from ethylene in good yields and by the use of comonomers(s) with ethylene, substituted butenes, particularly phenyl butenes, may be produced.

When co-oligomerising ethylene it is preferable that oligomerisation of the ethylene should be allowed to begin and then the comonomer(s) added in aliquots or continuously as oligomerisation proceeds. Particularly preferred as co-oligomers with ethylene are cyclic hydrocarbons having at least one vinyl group especially vinyl aromatic and substituted vinyl aromatic compounds having one or more vinyl group (s) attached to the aromatic ring. Examples of these are styrene, $\alpha$-methyl styrene, ethyl styrene and divinyl benzene. Vinyl cyclohexene may also be used with advantage.

By means of this catalyst system, products suitable as monomers for subsequent polymerisations may be produced. In some cases a route to commercial quantities of organic chemicals which would be otherwise expensive or difficult to obtain is provided.

The following examples illustrate the invention:

EXAMPLE 1

To a 1 litre 5-necked reaction vessel, with stirrer, thermometer, gas inlet and outlet assembled at 180° C. under nitrogen, was added 500 mls. of a dry, purified mixture of 50:50 by volume hexane/cyclohexane. The solvent was cooled to 0° C. and then ethylene was bubbled through for 30 minutes the temperature rising to 10° C. $Ni(PCl_3)_4$ (0.25 millimole), $AlBr_3$ incyclohexane (5 millimoles) and LiBu in hexane (7.5 millimoles) were added rapidly by syringe, in that order. Addition of $AlBr_3$ to $Ni(PCl_3)_4$ caused the solution to change from pale yellow to lime green, and a further change to dark brown occurred on addition of LiBu. Ethylene was steadily absorbed at about 0.7 litre per minute throughout the run of 1 hour, and without external cooling, the temperature rose from 10° C. to 45° C.

Analysis of the solution by gas liquid chromatography showed that the following oligomers were present in the solvent at a concentration of about 8%:

Butene-1=2.2%
Trans-butene-2=69.5%
Cis-butene-2=28.3%

Examples 2, 3 and 4 are for comparison and show that all three components of the catalyst system are required.

EXAMPLE 2

Example 1 was repeated using ethylene but with 0.25 millimole $Ni(PCl_3)_4$ and 7.5 millimoles of BuLi as catalyst. No ethylene absorption or exotherm occurred and no dimers were found in solution.

EXAMPLE 3

The procedure of Example 1 was repeated using $Ni(PCl_3)_4$ (0.25 millimole), $AlBr_3$ (5 millimoles) only. No ethylene absorption occurred.

EXAMPLE 4

The procedure of Example 1 was repeated using $AlBr_3$ (5 millimoles) and BuLi (7.5 millimoles) as catalyst. A white precipitate formed on mixing these two components and no ethylene absorption occurred.

EXAMPLE 5

Ethylene was passed through a 1 liter reactor as before using $Ni(PCl_3)_4$ (0.25 millimole), a complex of $AlCl_3$ and anisole in benzene (5 millimoles) and lithium butyl (7.5 millimoles) as catalyst. After 1 hour during which the temperature rose from 10° to 42° C. the solution contained:

Butene-1—990 p.p.m.
t-Butene-2—3.6%
c-Butene-2—1.43%
Hexene-1—Trace
Hexene-2—370 p.p.m.
Octenes—0.017%

EXAMPLE 6

A dry mixture of 250 mls. hexane/250 mls. cyclohexane was pumped into a 1 liter reaction vessel, equipped with thermometer, stirrer, compensated tap funnel, gas inlet and syringe inlet, under dry nitrogen. The solvent was stirred and cooled to 0°–5° C. and a stream of ethylene was then passed through for 15 minutes venting through a paraffin oil bubbler. At the end of the presaturation period the catalyst components were added by syringe in the following order:

(1) 0.25 millimole (0.152 g.) $Ni(PCl_3)_4$ dissolved under nitrogen in dry cyclohexane.
(2) 5 millimoles $AlBr_3$ dissolved in 5 mls. cyclohexane.
(3) 7.5 millimoles LiBu added as a 9.7% w./v. solution in hexane.

The solution temperature was allowed to rise and when it reached 15° C. ethylene dimerisation to butenes commenced, as shown by sucking back in the oil bubbler. At this point, 2 mls. purified, polymerisation grade, styrene was added from the tap funnel, the ethylene suck-back ceased and it bubbled freely through the bubbler again. After several minutes, sucking-back occurred again and a further 2 mls. styrene was added. The sequence of suckback and styrene addition was continued for 1 hour during which time 12 mls. of styrene was added. The gas supply turned off and the solution washed successively with dilute (5%) KOH and water and dried over $CaCl_2$. Solvent was removed by evaporation at 40–50° C. under water pump pressure to leave 12.8 g. clear liquid. 10.6 g. of this was shown by G.L.C. analysis, molecular weight and boiling range to be a mixture of phenyl butenes. The remaining 2.2 g. material was distilled under vacuum and found to be mainly a mixture of higher oligomers formed from 2 molecules of styrene and one of ethylene. The solvent removed contained 1.8 g. cis and trans butene-2. The phenyl butenes were separated by preparative vapor phase chromatography using a varian "Autoprep" and identified by refractive index and N.M.R. spectra as:

(1) 3-phenyl butene-1, 32%, $n_d^{25}=1.5036$
  N.M.R. $\tau=8.75$, doublet, area 3, methyl proton
  $\tau=6.63$, quartet, area 1, CH proton
  $\tau=5.0$, doublet, area 2, vinylic proton
  $\tau=4.0$, complex, area 1=CH
  $\tau=2.83$ area 5, aromatic
(2) trans-2-phenyl butene-2, 7%, $n_d^{25}=1.5225$.
  N.M.R. $\tau=8.43$, doublet, area 3, methyl proton
  $\tau=7.99$, singlet, area 3, methyl proton
  $\tau=4.45$, doublet, area 1=CH
  $\tau=2.81$ area 5 aromatic
(3) cis 2-phenyl butene-2, 44.5%, $n_d^{25}=1.5322$
  N.M.R. $\tau=8.35$, doublet, area 3, methyl proton
  $\tau=8.10$, singlet, area 3, methyl proton
  $\tau=4.18$, quartet, area 1=CH
  $\tau=2.79$ area 5 aromatic
(4) 2-phenyl butene-1, 5.7%, $n_d^{25}=1.5268$
  N.M.R. $\tau=9.02$, triplet, area 3, methyl proton
  $\tau=7.63$, quartet area 2, methylene proton
  $\tau=4.89$, doublet area 2, vinylic proton.

The higher oligomers were distilled on a spinning band column to give a small amount of unidentified phenyl hexenes and:

(1) 2:5 diphenyl hexene-1, B.P. 127–129° C. at 1.5 mm., $n_d^{25}=1.5632$
(2) 3:5 diphenyl hexene-1, B.P. 100° C. at 0.4 mm., $n_d^{25}=1.5552$

EXAMPLE 7

The procedure of Example 1 was repeated using as catalyst components (a) 0.25 millimole $Ni(PCl_3)_4$ added to solvent in reaction flask as a solid.

(b) 5 millimoles AlBr₃ dissolved in 5 mls. cyclohexane
(c) 7.5 millimoles LiBu added as a 9.7% w./v. solution in hexane.

when butene formation commenced at about 15° C., dry redistilled α-methyl styrene was added 2 ml. at a time whenever ethylene bubbled from the solution through the exit oil bubbler. The solution temperature rose to a maximum of 42° C. without external heating or cooling and after 1½ hours a total of 18 g. α-methyl styrene had been added. The product was worked up as before and gave 20.5 g. liquid residue after evaporation on a Buchi rotary film evaporation.

G.L.C. showed this to contain 5% residual solvent, 27% unreacted α-methyl styrene and 68% of an unidentified liquid. This liquid was separated on an "Autoprep" preparative V.P.C. and identified as:

3 phenyl-3 methyl butene-1, M.W.=141 measured by ebulliometry (required=145).
$n_d^{25}$=1.5062
B.P. 45° at 4 mm.
N.M.R. Spectrum:
τ=8.67, singlet, area 6, methyl protons
τ=5.00 complex doublet, area 2, vinylic protons
τ=3.97 quartet, area 1=CH
τ=r 2.8 area 5, aromatic.

EXAMPLE 8

The procedure of Example 7 was repeated but an ethyl vinyl benzene/divinyl benzene mixture was used as comonomer instead of α-methyl styrene.

The E.V.B./D.V.B. mixture was purified by distillation under vacuum, once through KOH pellets and once through molecular sieve 4A. With an ethylene flow of 300 cc. per minute, 60 mls. of vinylic monomer was added 2 mls. at a time on demand over 2 hours with a maximum exotherm temperature of 45° C.

After working up as before, 70.6 g. of oligomerised material was obtained. G.L.C. showed the presence of 9 oligomers in the mixture. A separation into 4 simpler fractions was achieved by vacuum distillation and separation of the major components was completed on the Auto preparative V.P.C. The isolated complexes comprised a set of 3 different compounds (o, m, p forms not identified) formed from 1 mole of ethyl benzene and 1 mole ethylene and a set 2 different compounds (each had 2 isomers which were o, m or p but not identified) formed from 1 mole divinyl benzene and 2 moles of ethylene.

Group (1) ethylene+ethyl vinyl benzene (M.W. Found=148).

(1) 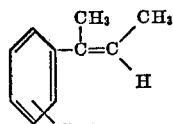   cis-2-ethyl phenyl butene-2

N.M.R. τ—8.78, triplet, area 3, CH₃ in CH₂CH₃

τ=8.23, doublet, area 3, CH₃ in =C⟨CH₃ / H

τ=8.01 singlet, area 3, CH₃ in =C⟨CH₃ / Ph

τ=7.38, quartet, area 2, CH₂ in CH₂CH₃

τ=4.21, quartet, area 1, CH in =C⟨CH₃ / H

τ~2.9 area 5, aromatic.

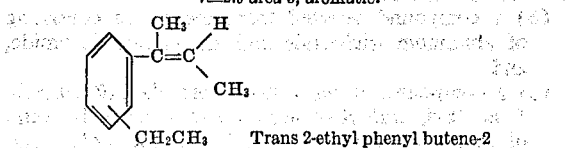   Trans 2-ethyl phenyl butene-2

N.M.R. τ=8.36, split doublet, area 3, CH₃ in =C⟨CH₃ / H

τ=8.78, triplet area, CH₃ in CH₂CH₃

τ=7.80 singlet area CH₃ in =C⟨CH₃ / Ph

τ=7.34, quartet, area 2, CH₂ in CH₂CH₃

τ=4.95, doublet area 1 CH in =CH⟨CH₃

τ~2.9 area 5, aromatic.

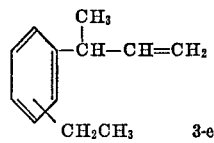

CH₂CH₃   3-ethylphenyl butene-1

N.M.R. τ~8.7, doublet + triplet area 6, methyl groups in CH₂CH₃
and —CH— ⟨CH₃

τ=7.38, quartet, area 2, CH₂ in CH₂CH₃
τ=6.57, quartet, area 1 CH in —CH— ⟨CH₃

τ=5.0, split doublet area 2, vinylic CH₂
τ~4, complex area 1, =CH—
τ=2.83, area 5, aromatic.

What we claim is:
1. A process in which ethylene is catalytically oligomerised or co-oligomerised with at least one cyclic hydrocarbon, said cyclic hydrocarbon having at least one vinyl group attached thereto, said process being conducted in the presence of a catalyst system comprising:
(a) a zerovalent nickel complex with phosphorous ligands of the general formula

Ni(PX₃)₄ wherein X is a halogen,
(b) aluminum trichloride or aluminum tribromide, and
(c) a compound of the general formula MR wherein M is a group I metal and R is alkyl, aryl or aralkyl, wherein the molar ratio of (b):(a) is at least 7.5:1 and the molar ratio of (c):(a) is at least 15:1.

2. A process according to claim 1 in which the catalyst components are added to an organic solvent containing at least one of the monomers to be oligomerised or co-oligomerised.

3. A process according to claim 2 wherein catalyst component (a) is added in an amount giving a concentration of at least 0.25 millimole per liter.

4. A process according to claim 1 wherein catalyst component (c) is added to a mixture of components (a) and (b).

5. A process in which ethylene is catalytically oligomerised or co-oligomerised with at least one cyclic hydrocarbon, said cyclic hydrocarbon having at least one vinyl group attached thereto, said process being conducted in the presence of a catalyst system comprising:
(a) a zerovalent nickel complex with phosphorous ligands of the general formula Ni(PX₃)₄ wherein X is a halogen,
- (b) a compound selected from the group consisting of aluminum trichloride and aluminum tribromide, and
- (c) a compound of the general formula LiR wherein R is alkyl, aralkyl or aryl, wherein the molar ratio of (a):(b) is from 1:7.5 to 1:25 and the molar ratio of (a):(c) is from 1:15 to 1:35.

6. A process in which ethylene is catalytically oligomerised or co-oligomerised with at least one cyclic hydrocarbon, said cyclic hydrocarbon having at least one vinyl group attached thereto, said process being conducted in the presence of a catalyst system comprising:
- (a) a zerovalent nickel complex with phosphorous ligands of the general formula $$Ni(PX_3)_4$$

wherein X is a halogen,
- (b) a compound selected from the group consisting of aluminum trichloride and aluminum tribromide, and
- (c) a compound of the general formula LiR wherein R is alkyl, aralkyl or aryl, wherein the molar ratio of (a):(b) is from 1:7.5 to 1:25 and the molar ratio of (a):(c) is from 1:15 to 1:35.

References Cited

UNITED STATES PATENTS

| | | | |
|---|---|---|---|
| 3,076,016 | 1/1963 | Leto et al. | 260—468 |
| 3,249,641 | 5/1966 | Storrs et al. | 260—666 |
| 3,306,948 | 2/1967 | Kealy | 260—680 |
| 3,536,778 | 10/1970 | Bergem et al. | 260—683.15 |

FOREIGN PATENTS

| | | | |
|---|---|---|---|
| 6,712,974 | 3/1968 | Netherlands | 260—683.15 |

PAUL M. COUGHLAN, Jr., Primary Examiner

U.S. Cl. X.R.

252—429 C; 260—666 A, 671 A, 683.15 D